United States Patent

Iwamoto et al.

[11] Patent Number: 6,154,132
[45] Date of Patent: Nov. 28, 2000

[54] DISPLAY SYSTEM OF A THEFT PREVENTING APPARATUS HAVING TWO KINDS OF THEFT PREVENTION

[75] Inventors: Koji Iwamoto, Higashikamo-gun; Manabu Mizutani; Masachika Kamiya, both of Toyota; Takao Akatsuka, Aichi-gun, all of Japan

[73] Assignee: Toyota Jidosha Kabushiki Kaisha, Toyota, Japan

[21] Appl. No.: 09/194,148

[22] PCT Filed: May 21, 1997

[86] PCT No.: PCT/JP97/01703

§ 371 Date: Aug. 24, 1999

§ 102(e) Date: Aug. 24, 1999

[87] PCT Pub. No.: WO97/44764

PCT Pub. Date: Nov. 27, 1997

[30] Foreign Application Priority Data

May 21, 1996 [JP] Japan ................................. 8-125666

[51] Int. Cl.[7] ................................................. G08B 21/00
[52] U.S. Cl. ................. 340/540; 340/425.5; 340/426; 340/427; 340/691.1; 340/691.2
[58] Field of Search ................... 340/540, 425.5, 340/426, 427, 691.1, 691.2, 691.3, 691.4, 517, 518, 519, 525, 815.4, 815.5; 307/10.5, 10.2

[56] References Cited

U.S. PATENT DOCUMENTS

| 5,610,574 | 3/1997 | Mutoh et al. ............................. 340/426 |
| 5,631,501 | 5/1997 | Kubota et al. ........................... 307/10.5 |
| 5,633,624 | 5/1997 | Meada et al. ............................ 340/426 |
| 5,641,998 | 6/1997 | Maeda et al. ........................... 307/10.2 |
| 5,686,883 | 11/1997 | Mutoh et al. ............................ 340/426 |

FOREIGN PATENT DOCUMENTS

| 57-156993 | 10/1983 | Japan . |
| 60-176193 | 9/1985 | Japan . |
| 61-156693 | 7/1986 | Japan . |
| 61-127060 | 8/1986 | Japan . |
| 2-164644 | 6/1990 | Japan . |
| 4-197853 | 7/1992 | Japan . |

*Primary Examiner*—Jeffery A. Hofsass
*Assistant Examiner*—Hung Nguyen
*Attorney, Agent, or Firm*—Pillsbury Madison & Sutro LLP

[57] ABSTRACT

The present invention relates to a display system for a theft-preventing apparatus mounted on a vehicle, and an object of the present invention is to provide a display system in which a display device can be commonly used for two kinds of theft-preventing apparatuses. A security ECU (20) outputs a continuous lighting signal when set to a waiting state, and stops outputting the signal in a cautioning state. An immobilizer ECU (22) outputs a blinking signal to a light-emitting device (50) only when the cautioning state is set. Accordingly, the light-emitting device (50) is turned off when both the security apparatus and the immobilizer apparatus are set to a resting state. Additionally, the light-emitting device (50) is continuously lighted when the security apparatus is in the waiting state. Further, the light-emitting device (50) is being blinked when the security apparatus is not set to the waiting state and the immobilizer apparatus is set to the cautioning state.

11 Claims, 5 Drawing Sheets

DISPLAY SYSTEM OF A THEFT PREVENTING APPARATUS HAVING TWO KINDS OF THEFT PREVENTION

TECHNICAL FIELD

The present invention relates to a display system of a theft-preventing apparatus provided to a vehicle and, more particularly, to a display system of a theft-preventing apparatus in which a display apparatus can be commonly used for two kinds of theft-preventing apparatuses.

BACKGROUND ART

Conventionally, a theft-preventing apparatus has been developed for preventing a theft of a vehicle, parts of a vehicle or an attachment of a vehicle. The theft-preventing apparatus prevents a theft by generating an alarm such as a horn or prohibiting a start of the vehicle when the theft-preventing apparatus detects that an unauthorized person intrudes into the vehicle.

Japanese Laid-Open Patent Application No.4-197853 discloses such a theft-preventing apparatus. This theft-preventing apparatus enters a waiting mode and starts blinking a display apparatus when doors of a vehicle is detected to be locked. In the waiting mode, an alarm is not generated even if the doors are unlocked by means other than a key. Thereby, an alarm is prevented from being generated when a passenger remains in the vehicle unlocks a door from inside the vehicle so as to get off from the vehicle after the door was locked. The waiting state is continued for a predetermined time period. After the predetermined time period is elapsed, the theft-preventing apparatus shifts from the waiting state to a cautioning state. In the cautioning state, an alarm signal is generated by providing a drive signal to a horn or a lamp when it is detected that one of the doors is opened by means other than the key or a posture of the vehicle is changed. Additionally, caution is given to a person who attempts a theft so as to provided an effect to prevent a theft by continuously blinking the display apparatus in the cautioning state. In the above-mentioned conventional theft-preventing apparatus, a blinking period of the display apparatus is changed between the waiting state and the cautioning state, and, thereby, it is possible to distinguish the cautioning state from the waiting state.

As a vehicle theft-preventing apparatus different from the above-mentioned conventional theft-preventing apparatus, for example, an apparatus (referred to as an immobilizer apparatus) for preventing a start of an engine by a key other than a correct key is known. The immobilizer apparatus previously provides a key code and a registered code to a key and a vehicle, respectively. A start of the engine is permitted only when the key code matches the registered code. Thus, according to the immobilizer apparatus, it is difficult to start a vehicle without using the correct key, and, thereby, the vehicle is prevented from being theft.

The immobilizer apparatus is set to the cautioning state in which a start of the engine is prohibited at the time when the key is removed from an ignition-key cylinder. When the immobilizer apparatus is in the cautioning state, the owner of the vehicle is notified that the apparatus is normally operated. At the same time, a display such as blinking of the display apparatus is performed so as to give a caution to a thief.

As mentioned above, the immobilizer apparatus has the same purpose as the above-mentioned conventional theft-preventing apparatus with respect to prevention of theft of a vehicle. Accordingly, when both the above-mentioned conventional theft-preventing apparatus and the immobilizer apparatus are provided to the same apparatus, time periods of the waiting states of these apparatuses are substantially equal to each other. Accordingly, there may be no problem if displays indicating operational states of these theft-preventing apparatuses are common to each other.

However, since the above-mentioned conventional theft-preventing apparatus does not consider common use with the immobilizer apparatus, an exclusive display apparatus must be provided other than that of the immobilizer apparatus. That is, the above-mentioned theft-preventing apparatus has a problem in that a number of parts is increased since a display apparatus must be provided for each theft-preventing apparatus when the theft-preventing apparatus is provided together with other theft-preventing apparatuses.

DISCLOSURE OF THE INVENTION

It is a general object of the present invention to provide an improved and useful display system for a theft-preventing apparatus in which the above-mentioned problems are eliminated.

A more specific object of the present invention is to provide a display system for a theft-preventing apparatus in which, when a plurality of theft-preventing apparatuses are provided, an increase in the number of parts can be prevented by commonly using a display apparatus so that checking of an operation and a state of operation can be positively performed for each of the apparatuses.

In order to achieve the above-mentioned objects, there is provided according to one aspect of the present invention a display system for a theft-preventing apparatus for displaying operational states of a first theft-preventing apparatus and a second theft-preventing apparatus, the first theft-preventing apparatus being set to one of a resting state in which a caution with respect to a theft is not performed, a waiting state in which a start of a caution to a theft is waited for and a cautioning state in which a caution to a theft is performed, the second theft-preventing apparatus being set to one of the resting state and the cautioning state, characterized by:
 a first signal outputting unit outputting a first signal when the first theft-preventing apparatus is in the waiting state;
 a second signal outputting unit outputting a second signal when the second theft-preventing apparatus is in the cautioning state; and
 a display device connected to the first signal outputting unit and the second signal outputting unit, the display device provides a display corresponding to the first signal when the first signal is output, the display device provides a display corresponding to the second signal when the first signal is not output and the second signal is output.

In the above-mentioned invention, the first signal outputting unit of the first theft-preventing apparatus outputs the first signal to the display device when the waiting state is set. On the other hand, the second signal outputting unit of the second theft-preventing apparatus outputs the second signal to the display device when the waiting state is set. The display device provides a display in response to the first predetermined signal when the first predetermined signal is output, and provides a display in response to the second predetermined signal when the first predetermined signal is not output and the second predetermined signal is output. Thereby, the display device provides a display in response to the first signal when the first theft-preventing apparatus is set to the waiting state, and the display device provides a display in response to the second signal when the first theft-preventing apparatus is not set to the waiting state and the second-preventing apparatus is set to the cautioning state. Accordingly, one can distinguish, by the display of the display device, a state in which the first theft-preventing apparatus is set to the waiting state and a state in which the first theft-preventing apparatus is not set to the waiting state and at least one of the first and second theft-preventing apparatuses is set to the cautioning state.

In one embodiment of the present invention, the first signal outputting unit may stop outputting the first signal when one of the cautioning state and the resting state is set, and the second signal outputting unit may stop outputting the second signal when the resting state is set.

Additionally, the first signal outputting unit may be provided to the first theft-preventing apparatus, and the second signal outputting unit may be provided to the second theft-preventing apparatus.

Additionally, the display device may include a light-emitting element having a terminal connected to the first signal outputting unit and the second signal outputting unit and having an opposite terminal being grounded.

Further, the first signal outputting unit may include a first rectifying element which permits a flow of the first signal toward the display device and interrupts a flow of the second signal from the second signal outputting unit, and the second signal outputting unit may include a second rectifying element which permits a flow of the second signal toward the display device and interrupts a flow of the first signal from the first signal outputting unit.

Additionally, there is provided according to another aspect of the present invention a display system for a theft-preventing apparatus for displaying an operational state of a first theft-preventing apparatus, the first theft-preventing apparatus being set to one of a resting state in which a caution with respect to a theft is not performed, a waiting state in which a start of a caution to a theft is waited for and a cautioning state in which a caution to a theft is performed, a second theft-preventing apparatus being set to one of the resting state and the cautioning state being further provided to the display system, the second theft-preventing apparatus having a second signal outputting unit outputting the second signal when the cautioning state is set, characterized by:

a first signal outputting unit outputting a first signal representing a state of the first theft-preventing apparatus;

a display device, connected to the first signal outputting unit, for providing a display in accordance with the first signal, the first outputting unit also connectable to the second theft-preventing apparatus;

a determining unit detecting a presence of the second signal from the second theft-preventing apparatus; and a display selecting unit outputting the first signal in accordance with a state of the first theft-preventing apparatus when the determining unit detects that the second signal is not output from the second theft-preventing apparatus, the display selecting unit outputting the first signal in accordance with both a state of the first theft-preventing apparatus and a state of the second theft-preventing apparatus when the determining unit detects that the second signal is present.

In the above-mentioned invention, presence of an output signal (the second signal) of the second theft-preventing apparatus is detected by the determining unit, the second theft-preventing apparatus being set to one of the resting state in which a caution to a theft is not performed and the cautioning state in which a caution to a theft is performed. When it is detected that the output signal of the second theft-preventing apparatus is not present, the display selecting unit outputs the display signal (the first signal) based on the state of the first theft-preventing apparatus to the display device. Accordingly, the display device is set to a lighting state corresponding to the state of the first theft-preventing apparatus. On the other hand, if it is detected that the output signal of the second theft-preventing apparatus is present, the output selecting unit outputs to the display device the display signal based on both states of the first theft-preventing apparatus and the second theft-preventing apparatus. Accordingly, the display device is set to a lighting state corresponding to the states of the first theft-preventing apparatus and the second theft-preventing apparatus. Thus, the state of each of the theft-preventing apparatuses is displayed on the display device irrespective of presence of the output signal of the second theft-preventing apparatus.

Additionally, the second signal outputting unit may stop outputting the second signal when the resting state is set.

Additionally, the first signal outputting unit may be provided to the first theft-preventing apparatus.

Additionally, the display device may include a light-emitting element having a terminal connected to the first signal outputting unit and having an opposite terminal being grounded.

Additionally, the first signal outputting unit may include a first rectifying element which permits a flow of the first signal toward the display device and interrupts a flow of the second signal from the second signal outputting unit, and the second signal outputting unit may include a second rectifying element which permits a flow of the second signal toward the display device and interrupts a flow of the first signal from the first signal outputting unit.

Further, the determining unit may includes:

a third rectifying element which permits a flow of the second signal from the second signal outputting unit and interrupts a reverse flow of the second signal; and a transistor, connected to the third rectifying element, for outputting one of a high-level signal and a low-level signal in accordance with the second signal.

Other objects, features and advantages of the present invention will become more apparent from the following detailed description when read in conjunction with the accompanying drawings.

BEST MODE FOR CARRYING OUT THE INVENTION

Figure 1:
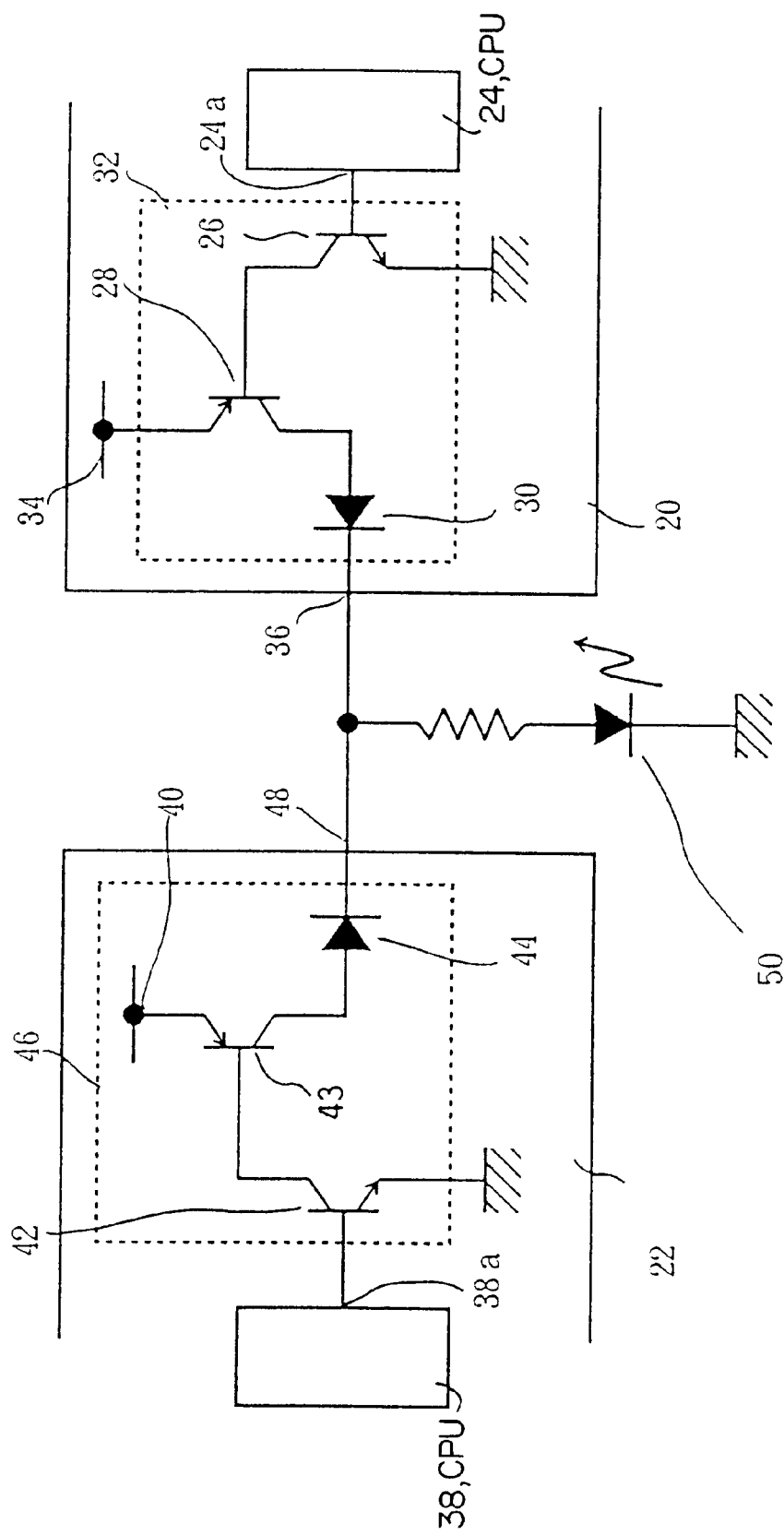
FIG. 1 is a circuit diagram of a display system according to a first embodiment of the present invention.

FIG. 1 is a circuit diagram of a display system according to a first embodiment of the present invention. In the present embodiment, an example is indicated in which a display apparatus for a theft-preventing apparatus is applied to both a security apparatus which is one kind of theft-preventing apparatuses and an immobilizer apparatus.

The security apparatus generates an alarm signal to announce an abnormality by driving a horn or a lamp of a vehicle when an abnormality such as opening of a door of the vehicle without using a correct key is detected. The security apparatus enters a cautioning state via a waiting state lasting a predetermined time period when all doors of the vehicle are locked. In the cautioning state, an alarm signal is generated when the above-mentioned abnormality is detected. In the waiting state, the alarm signal is not generated even when the above-mentioned abnormality is detected. The waiting state is provided for preventing a generation of the alarm signal which is caused by unlocking the door from inside by a passenger remaining in the vehicle when the door is locked in a state in which the passenger remains in a seat next to the driver or a rear seat.

The immobilizer apparatus receives a code transmitted from a key inserted into an ignition-key cylinder. A start of the vehicle is permitted when the code matches a previously stored registered code. The security apparatus and the immobilizer apparatus are controlled by a security electronic control unit (hereinafter referred to as a security ECU) 20 and an immobilizer electronic control unit (hereinafter referred to as an immobilizer ECU) 22, respectively. The security ECU 20 has a CPU 24. A key switch for detecting a locked or unlocked state of a door, a courtesy switch for detecting an open or closed state of each door, a horn drive relay for driving a horn and a lamp drive relay for driving a head lamp (each not shown in the figure) are connected to the CUP 24. The CPU 24 control a drive signal provided to each of the above-mentioned according to outputs of the key switch and the courtesy switch.

Further, drive transistors 26 and 28 and a light-emitting device drive circuit 32 comprising a drive diode 30 are connected to an output terminal 24a of the CPU 24. In the light-emitting device drive circuit 32, when the CPU 24 outputs a high-level output to the output terminal 24a, the drive transistors 26 and 28 are turned on and a voltage supplied by a power source 34 is output to a display output terminal 36 of the security ECU 20 via the drive diode 30. On the other hand, in a state in which the CPU 24 outputs a low-level output to the output terminal 24a, the drive transistors 26 and 28 are turned off and a voltage is not output to the display output terminal 36.

The CPU 24 of the security ECU 20 enters the waiting state when it detects that the door is locked according to an output of the key switch. In the waiting state, The CPU 24 outputs a waiting signal indicating the waiting state to the output terminal 24a. As described later, the waiting signal is a continuous signal maintaining an ON state. Further, the CPU 24 enters the cautioning state and stops outputting the waiting signal when a predetermined time T is elapsed after entering the waiting stated. In the cautioning state, the CPU 24 outputs drive signals to the horn drive relay and the lamp drive relay so as to generate an alarm when the CPU 24 detects that one of the doors is opened by means other than a key in accordance with outputs of the key switch and the courtesy switch.

On the other hand, the immobilizer ECU 22 has a CPU 38. An ignition switch for detecting whether or not the key is inserted into the ignition key cylinder, a receiving device for receiving a code transmitted by the key and an engine control unit for controlling an engine (each not shown in the figure) are connected to the CPU 38. The CPU 38 outputs an engine start permission signal to the engine control unit when the code output from the receiver matches a previously stored predetermined registered code. Additionally, a power source 40, drive transistors 42 and 43 and a light-emitting device drive circuit 46 including a drive diode 44 are connected to an output terminal 38a of the CPU 38. Similar to the light-emitting device drive circuit 32, the light-emitting device drive circuit 46 apparatus controls an on and off of an output of a voltage to the output terminal 48 in response to the output of the output terminal 38a of the CPU 38.

When the CPU 38 detects that the key is removed from the ignition-key cylinder in accordance with the output of the ignition switch, the immobilizer apparatus enters the cautioning state. In the cautioning state, the immobilizer ECU 22 outputs an engine start prohibiting signal to the engine control unit and outputs a caution signal indicating the cautioning signal to the output terminal 48. As described later, the cautioning signal is a pulse-like signal in which an on and off of a voltage is periodically repeated.

The display terminals 36 and 48 of the security ECU 20 and the immobilizer ECU 20 are connected to an input terminal of a light-emitting device 50. The light-emitting device 50 comprises, for example, a light-emitting diode that lights when a predetermined voltage is provided thereto.

According to the above-mentioned structure, at least one of the security ECU 20 and the immobilizer ECU 22 outputs a predetermined voltage to the display terminal 36 or 48, the predetermined voltage if provided to the light-emitting device 50 and, thus, the light-emitting device 50 lights.

It should be noted that, in the above-mentioned structure, when both the security ECU 20 and the immobilizer ECU 22 output the voltage at the same time, one of the output terminals 36 and 48 are provided with the voltage output form the other output terminals. The security ECU 20 and the immobilizer ECU 22 are provided with protective diodes 30 and 44, respectively, the drive transistors 28 and 43 are prevented from being affected by the voltage provided to the output terminals 36 and 48. Thereby, the circuits 32 and 46 are prevented from being damaged.

Figure 2:
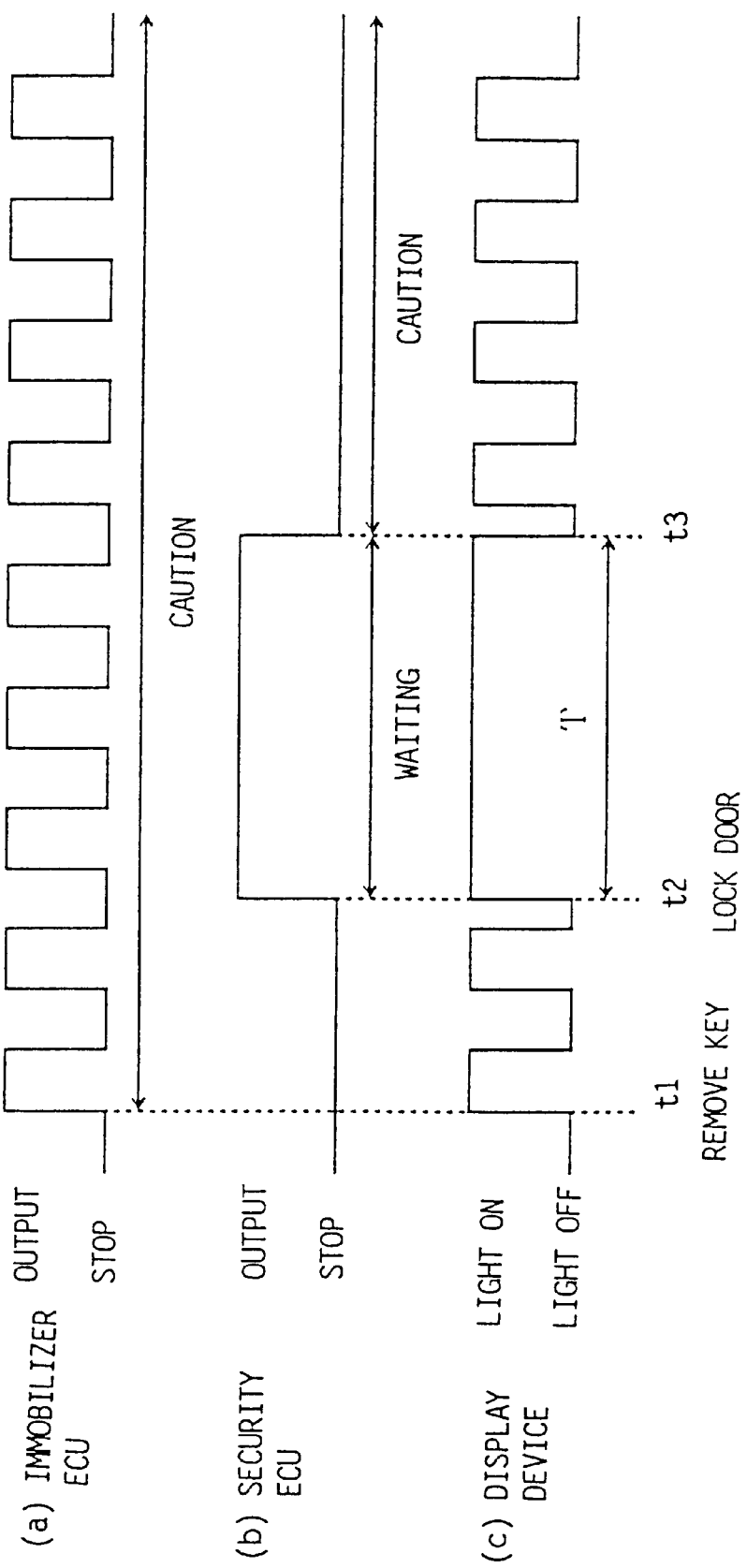
FIG. 2 is a time chart of a signal output to a light-emitting device from an immobilizer apparatus ECU and a security ECU and a state of lighting of the light-emitting device in the display system shown in FIG. 1.

A description will now be given, with reference to FIG. 2, of display signals that are output to the display output terminals 36 and 48 from the immobilizer ECU 22 and the security ECU 20. FIG. 2 is a time chart of the signals that are output to the display output terminals 36 and 48 from the immobilizer ECU 22 and the security ECU 20 and a state of lighting of the light-emitting device 50. In FIG. 2, before a time t1 is a state in which the correct key is inserted into the ignition-key cylinder, and both the immobilizer apparatus and the security apparatus are in a resting state. If the CPU 38 detects, at the time t1, that the key is removed from the ignition-key cylinder, the immobilizer ECU 22 starts to output a periodic blinking signal as shown in FIG. 2-(*a*). Thereby, the light-emitting apparatus 50 starts to blink as shown in FIG. 2-(*c*), and the driver is able to recognize that the immobilizer apparatus is normally set in the cautioning state. Thereafter, the immobilizer ECU 22 continuously outputs the blinking signal until the correct key is inserted into the ignition-key cylinder again. Next, if the CPU 24 detects, at a time t2, that a door is locked, the security ECU 20 switches the output to the display output terminal 36 to a continuous lighting signal as shown in FIG. 2-(*b*).

As mentioned above, the light-emitting device 50 lights when at least one of the security ECU 20 and the immobilizer ECU 22 outputs a predetermined voltage to the display terminal 36 ort 48. Accordingly, when the security ECU 20 outputs the continuous lighting signal as mentioned above while the immobilizer ECU 22 outputs the blinking signal, the light-emitting device 50 is rendered to be in a state in which the light-emitting device 50 continuously lights. Thereby, the driver is able to recognize that the security apparatus is normally set in the waiting state. Additionally, when a passenger remains inside the vehicle, the passenger inside the vehicle is able to recognize that the waiting state is set in which an alarm is not generated if a door is unlocked form inside the vehicle as long as the light-emitting device 50 continuously lights.

At a time t3 when a predetermined time T has elapsed after the time t2, the security apparatus is shifted from the waiting state to the cautioning state. At the time t3, the security ECU 20 stops outputting the continuous lighting signal, while the immobilizer ECU 22 continuously outputs the blinking signal after the time t3. Accordingly, after the time t3, the light-emitting device 50 is set to the blinking state again. Thereby, it is notified that the security apparatus is shifted from the waiting state to the cautioning state. Additionally, a caution is given to an unauthorized person by announcing that the theft-preventing apparatus is in operation by blinking of the light-emitting device 50, and, thus, there is an effect to prevent a theft from happening.

As mentioned above, in the system of the present embodiment, the light-emitting device 50 takes one of the unlighting state, the continuous lighting state and the blinking state in response to operational states of the immobilizer apparatus and the security apparatus, and, thereby, the operational states of two theft-preventing apparatus can be correctly displayed by the single light-emitting device 50.

Each of the above-mentioned immobilizer apparatus and the security apparatus can be independently mounted on a vehicle. Thus, according to a specification of optional parts, only one of the theft-preventing apparatus may be provided. In the system according to the present invention, even when only the immobilizer apparatus is mounted and the security apparatus is not mounted, an operational state of the immobilizer apparatus is displayed on the light-emitting device 50, as mentioned above, by the immobilizer ECU 22 outputting the blinking signal when the key is removed from the ignition-key cylinder. Thus, according to the system of the present embodiment, an operational state of the immobilizer apparatus can be correctly displayed without changing the structure of the immobilizer ECU 22 and the light-emitting device 50 and a routine for displaying performed by the CPU 38 of the immobilizer ECU 22 irrespective of presence of the security apparatus. Accordingly, the system of the present embodiment has a flexibility to be adapted to various optional specifications of the theft-preventing apparatuses.

It should be noted that, in the above-mentioned first embodiment, the security apparatus corresponds to a first theft-preventing apparatus, the immobilizer apparatus corresponds to a second theft-preventing apparatus and the light-emitting device 50 corresponds to a display apparatus.

Figure 3:
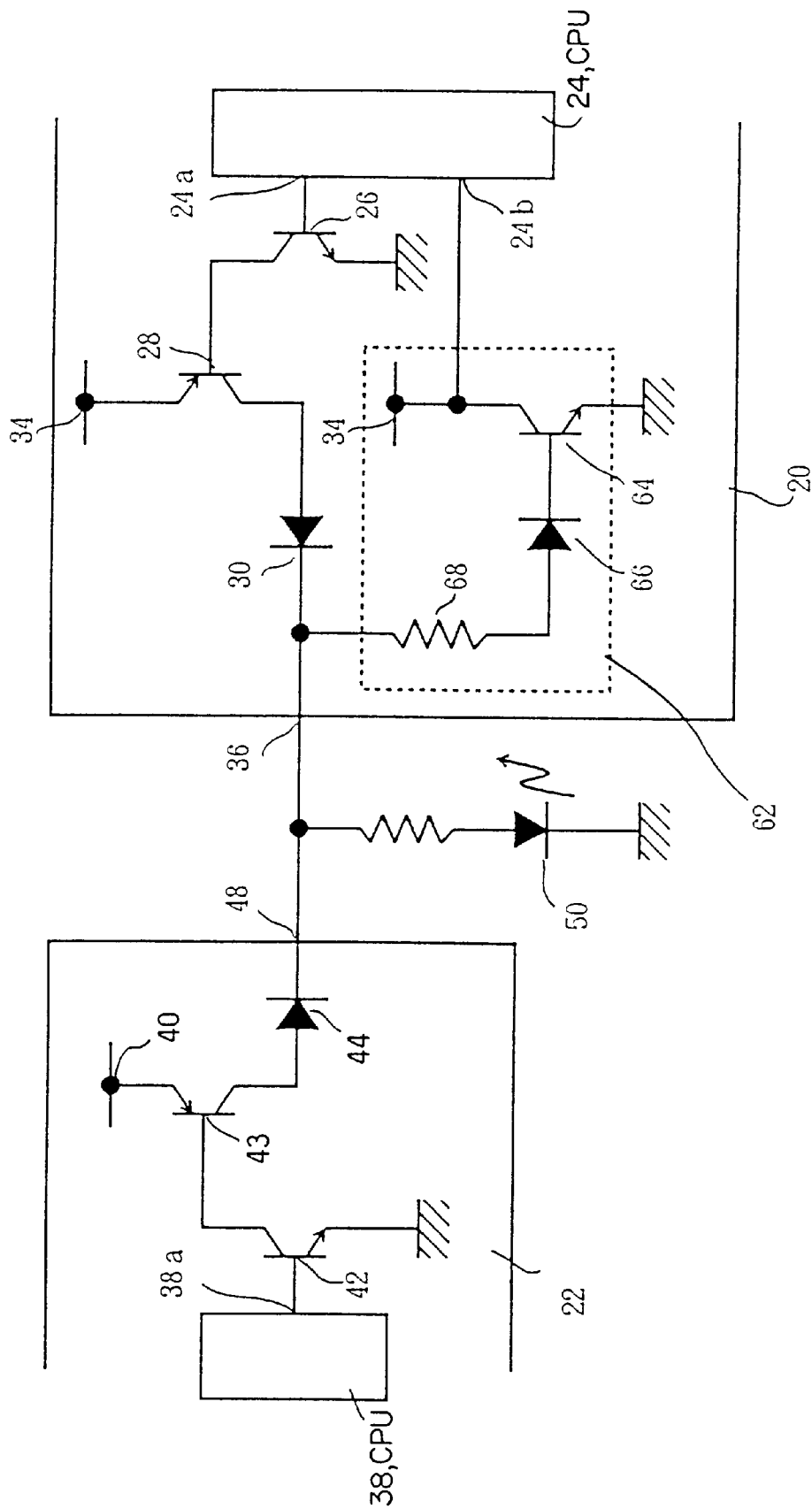
FIG. 3 is a circuit diagram of a display system according to a second embodiment of the present invention.

FIG. 3 shows a circuit diagram of a display system according to a second embodiment of the present invention. In the present embodiment, similar to the above-mentioned first embodiment, an example is indicated in which the display system for the theft-preventing apparatus according to the present invention is applied to the security apparatus and the immobilizer apparatus. It should be noted that, in FIG. 3, parts that are the same as the parts shown in FIG. 1 are given the same reference numerals, and descriptions thereof will be omitted.

As shown in FIG. 3, an immobilizer apparatus presence determining circuit 62 is connected between the display output terminal 36 of the security ECU 20 and the input terminal 24b of the CPU 24. The immobilizer apparatus presence determining circuit 62 comprises a transistor 64, a diode 66 and a resistor 68. A collector of the transistor 64 is connected to the input terminal 24b of the CPU 24 and the power source 34, and an emitter thereof is grounded. The resistor 68 and the diode 66 are connected in series between the output terminal 36 of the security ECU 20 and a base of the transistor 64. The diode 66 is provided so that a direction from the output terminal 36 to the transistor 64 corresponds to a normal direction. It should be noted that, in the system of the present embodiment, an ignition switch is also connected to the CPU 24 so as to detect whether or not a key is inserted into the ignition-key cylinder.

According to the above-mentioned structure, when the immobilizer ECU 22 outputs a voltage to the display output terminal 48, the voltage is provided to the base of the transistor 64 via the display output terminal 36, the resistor 68 and the diode 66. In this state, since the transistor 64 is turned on, a low-level input is input to the terminal 24b of the CPU 24. On the other hand, in a state in which the security ECU 20 does not output a voltage to the output terminal 36 and the immobilizer apparatus outputs a voltage to the output terminal 48, the voltage is not provided to the base of the transistor 64. In this state, since the transistor 64 is turned off, a high-level input is input to the input terminal 24b of the CPU 24.

In the system according to the present invention, similar to the system of the above-mentioned first embodiment, when the immobilizer ECU 22 detects that the key is removed from the key cylinder, the immobilizer ECU 22 starts to output the blinking signal as shown in FIG. 4(b). Accordingly, the CPU 24 of the security ECU 20 can detect whether or not the immobilizer apparatus is mounted by checking a state of the input terminal 24b after detecting that the key is removed from the key cylinder based on the output of the ignition switch.

As mentioned above, the security ECU 20 performs a determination as to whether or not the immobilizer apparatus is mounted by inputting the display signal output by the immobilizer ECU 22 to the input terminal 24b of the CPU 24 via the immobilizer apparatus presence determination circuit 62. In this case, if a noise enters the input terminal 24b, there is a possibility that an erroneous recognition is made that the immobilizer apparatus is present although the immobilizer apparatus is not mounted. In order to prevent such an erroneous recognition, the CPU 24 performs a filtering of the input signal to the input terminal 24b by a low-pass filter and performs the determination as to whether or not the immobilizer apparatus is mounted based on the filtered signal. Accordingly, a slight time delay is generated after the immobilizer ECU 22 starts the output of the display signal and until the security ECU 20 detects the display signal. Additionally, a slight time delay is generated due to a process time of the CPU 38 after the key is removed from the ignition-key cylinder and until the immobilizer ECU 22 starts to output the display signal. As mentioned above, in the system of the above-mentioned embodiment, a slight time delay is generated after the key is removed from the ignition-key cylinder and until the security ECU 20 correctly detects presence of the immobilizer apparatus.

Accordingly, if the security ECU 20 determines presence of the immobilizer apparatus immediately after the doors are locked, it is possible that the immobilizer apparatus is mounted is not correctly detected although the immobilizer apparatus is actually mounted due to the above-mentioned time delay when the driver locks the doors before the above-mentioned time delay has not been elapsed after the driver removes the key.

In order to eliminate such an inconvenience, in the system according to the above-mentioned embodiment, the CPU 24 of the security ECU 20 detects as to whether or not the immobilizer is mounted when a predetermined waiting time has been elapsed after it is detected that the key is removed from the ignition-key cylinder. Thereby, the CPU 24 is prevented from erroneously detecting presence of the immobilizer apparatus.

Figure 4:
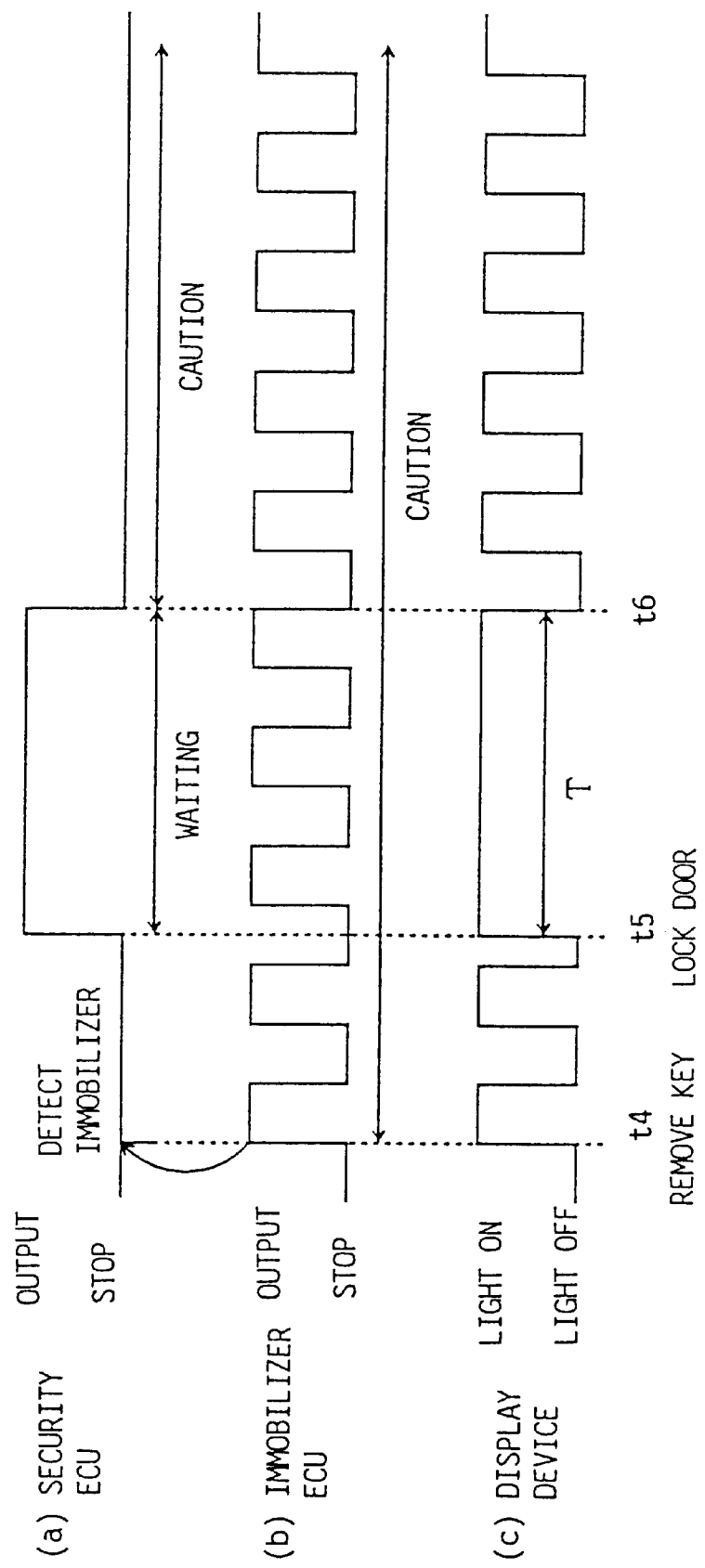
FIG. 4 is a time chart of a signal output to a light-emitting device from an immobilizer ECU and a security ECU and a state of lighting of the light-emitting device in the display system shown in FIG. 1 when an immobilizer apparatus is provided.

The security ECU 22 outputs two kinds of display signals in accordance with presence of the immobilizer apparatus detected as mentioned above. FIG. 4 shows a time chart of the display signal output by the security ECU 20 when the immobilizer is mounted, together with a time chart of the display signal output by the immobilizer ECU 22 and a lighting state of the light-emitting device 50. As shown in FIG. 4-(*a*), when the immobilizer ECU 22 detects that the key is removed from the ignition-key cylinder at a time t4, the immobilizer ECU 22 starts to output the blinking signal to the display output terminal 48. The security ECU 20 detects that the immobilizer apparatus is mounted by detecting a first pule wave of the blinking signal.

If it is detected, at a time t5, that the doors are locked, the security ECU 20 starts to output the continuous lighting signal which indicates the waiting state, and stops outputting the continuous lighting signal at a time t6 when a predetermined time period has been elapsed after the time t5.

Similar to the above-mentioned first embodiment, the light-emitting device 50 lights when a voltage is output to at least one of the output terminal 48 of the immobilizer apparatus and the display output terminal 36 of the security ECU 20. Accordingly, similar to the above-mentioned first embodiment, the light-emitting device 50 starts blinking at the time t4 and continuously lights at the time t5, and, thereafter, the light-emitting device 50 blinks again at the time t6. As mentioned above, when the security apparatus and the immobilizer apparatus are mounted, operational states of these apparatuses can be correctly displayed by the light-emitting device 50 taking one of the three states such as the unlighting state, the blinking state and the continuous lighting state in response to operational states of the security apparatus and the immobilizer apparatus.

Figure 5:
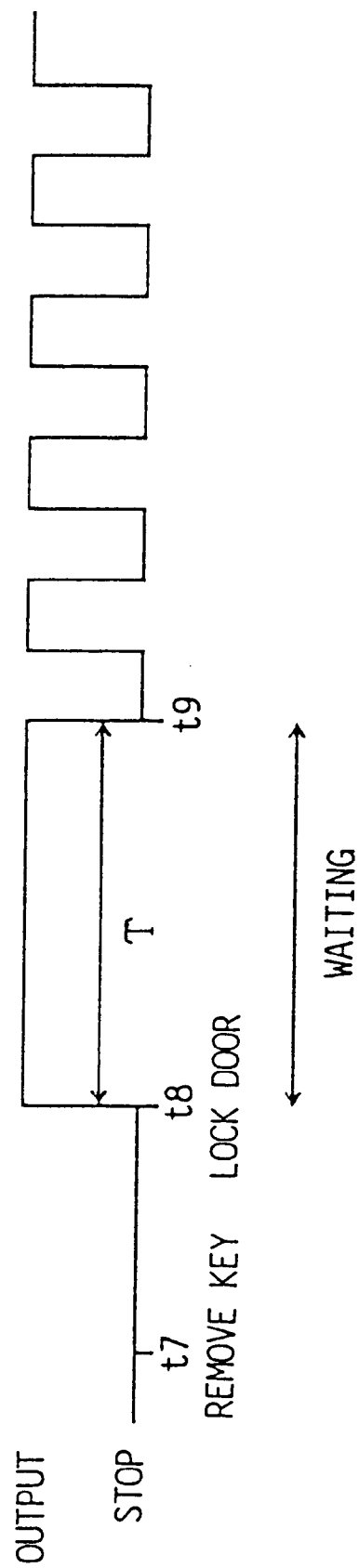
FIG. 5 is a time chart of a signal output to a light-emitting device from a security ECU in the display system shown in FIG. 3 when an immobilizer apparatus is not provided.

FIG. 5 shows a time chart of the display signal output by the security ECU 20 when it is detected that the immobilizer apparatus is not mounted. The CPU 24 of the security ECU 24 detects that the immobilizer apparatus is not mounted by the fact that the high-level input is not input to the input terminal 24*b* after detecting the key being removed from the ignition-key cylinder based on the output of the ignition switch. In this case, if it is detected that the doors are locked at a time t8, the security ECU 20 is set to the waiting state and starts to output the continuous lighting signal. Then, at a time t9 when the predetermined waiting time T has been elapsed after the time t8, the output to the light-emitting device 50 is switched from the continuous lighting signal to the blinking signal which indicates the cautioning state. Thereafter, the blinking signal is continuously output until the doors are unlocked by a method using a correct key.

As mentioned above, in the system according to the present invention, when the immobilizer is not mounted, the non-operating state, the waiting state and the cautioning state of the security apparatus can be displayed by the light-emitting device 50 by the security ECU 20 outputting the display signal as shown in FIG. 5.

It should be noted that when the immobilizer apparatus is mounted but the immobilizer apparatus is malfunctioning, the signal output by the immobilizer ECU 22 is not detected by the presence determining circuit 62. Accordingly, in such a case, similar to a case in which the immobilizer is not mounted, the security ECU 20 output the display signal as shown in FIG. 5. That is, even when the mounted immobilizer apparatus is malfunctioning, the non-operating state, the waiting state and the cautioning state of the security apparatus can be displayed by the light-emitting device 50.

As mentioned above, in the system according to the present embodiment, the security ECU 20 is provided with the immobilizer apparatus presence determining circuit 62 and the CPU 24 performs a routine to selectively output one of the display signal shown in FIG. 4-(*a*) and the display signal shown in FIG. 5 according to the signal from the immobilizer apparatus presence determining circuit 62. Thereby, the operational states of the security apparatus and the immobilizer apparatus can be appropriately displayed on the light-emitting device 50 when the immobilizer apparatus is mounted, and the operational state of the security apparatus can be appropriately displayed on the light-emitting device 50 when the immobilizer apparatus is not mounted.

Additionally, in the above-mentioned embodiment, when the security apparatus is not mounted and only the immobilizer apparatus is mounted, the light-emitting device 50 blinks in response to the display signal output by the immobilizer ECU 22. Accordingly, an operational state of the immobilizer apparatus can be correctly displayed on the light-emitting device 50 by the immobilizer ECU 22 starting to output the blinking signal at a time when a removal of the key is detected. Thus, according to the system of the present embodiment, the operational states of the security apparatus and the immobilizer apparatus can be appropriately displayed on the light-emitting device 50 without changing the structure of the immobilizer ECU 22 and a routine for display performed by the CPU 38 when the immobilizer apparatus is mounted, and the operational state of the immobilizer apparatus can be appropriately displayed on the light-emitting device 50 without changing the structure of the immobilizer ECU 22 and a routine for display performed by the CPU 38 when only the immobilizer apparatus is mounted.

Thus, according to the system of the present embodiment, both in the case in which the security apparatus and the immobilizer apparatus are mounted and the case in which only one of them is mounted, an operational state of the mounted theft-preventing apparatus can be displayed on the light-emitting device 50 without changing the structure of the ECU of each of the security apparatus and the immobilizer apparatus and contents of a routine performed by the CPU of each of the security apparatus and the immobilizer apparatus.

As mentioned above, according to the present embodiment, a display system for a theft-preventing apparatus can be achieved in which a number of light emitting devices is prevented from being increased when two kinds of theft-preventing apparatuses are provided, and a flexible can be obtained with respect to arbitrary mounting specifications of the security apparatus and the immobilizer apparatus.

Additionally, according to the system of the present invention, when both the security apparatus and the immobilizer apparatus are mounted and if one of them is cannot output the display signal due to malfunctioning, the other of them can provide the display signal to the light-emitting device 50. Accordingly, in such a case, the light-emitting device 50 can be blinked when one of the theft-preventing apparatus is in the cautioning operation, and, thereby, an effect for cautioning to a person attempting a theft can be maintained.

It should be noted that, in the above-mentioned second embodiment, the security apparatus corresponds to a first theft-preventing apparatus, the immobilizer apparatus corresponds to a second theft preventing apparatus, the light-emitting device 50 corresponds to a display apparatus and the immobilizer apparatus presence determining circuit 62 corresponds to a determining unit. Additionally, a display selecting unit is achieved by the security ECU selectively outputting the signal shown in FIG. 4-(*a*) or the signal shown in FIG. 5 in accordance with presence of the immobilizer.

As mentioned above, according to the present invention, an operation and an operational state of each of the first theft-preventing apparatus and the second theft-preventing apparatus can be displayed by a common display device so that the recognition of the operation and the operational states can be positively performed. Thereby, when the first theft-preventing apparatus and the second theft-preventing apparatus are provided, a number of the display devices is prevented from being increased.

Additionally, according to the present invention, an operation and an operational state of each of the first theft-preventing apparatus and the second theft-preventing apparatus can be displayed on a common display device, and, thereby, a number of the display devices is prevented from being increased when the first theft-preventing apparatus and the second theft-preventing apparatus are provided. Further, a change in the structure of the first theft-preventing apparatus is unnecessary irrespective of presence of the second theft-preventing apparatus. Thereby, a flexibility of the first theft-preventing apparatus with respect to various mounting specifications of the theft-preventing apparatuses is improved.

The present invention is not limited to the specifically disclosed embodiments, and variations and modifications may be made without departing from the scope of the present invention.

What is claimed is:

1. A display system for a theft-preventing apparatus for displaying operational states of a first theft-preventing apparatus and a second theft preventing apparatus, said first theft-preventing apparatus being set to one of a resting state in which a caution with respect to a theft is not performed, a waiting state in which a start of a caution to a theft is waited for and a cautioning state in which a caution to a theft is performed, said second theft-preventing apparatus being set to one of the resting state and the cautioning state, characterized by:

a first signal outputting unit (20) outputting a first signal when said first theft-preventing apparatus is in said waiting state;

a second signal outputting unit (22) outputting a second signal when said second theft-preventing apparatus is in said cautioning state; and a display device (50) connected to said first signal outputting unit (20) and said second signal outputting unit (22), said display device provides a display corresponding to said first signal when said first signal is output, said display device provides a display corresponding to said second signal when said first signal is not output and said second signal is output.

2. The display system for a theft-preventing apparatus as claimed in claim 1, characterized in that said first signal outputting unit (20) stops outputting said first signal when one of said cautioning state and said resting state is set, and said second signal outputting unit (22) stops outputting said second signal when said resting state is set.

3. The display system for a theft-preventing apparatus as claimed in claim 1, characterized in that said first signal outputting unit (20) is provided to said first theft-preventing apparatus, and said second signal outputting unit (22) is provided to said second theft-preventing apparatus.

4. The display system for a theft-preventing apparatus as claimed in claim 1, characterized in that said display device (50) includes a light-emitting element (50) having a terminal connected to said first signal outputting unit (20) and said second signal outputting unit (22) and having an opposite terminal being grounded.

5. The display system for a theft-preventing apparatus as claimed in claim 1, characterized in that said first signal outputting unit (20) includes a first rectifying element (30) which permits a flow of the first signal toward said display device (50) and interrupts a flow of said second signal from said second signal outputting unit (22), and said second signal outputting unit (22) includes a second rectifying element (44) which permits a flow of the second signal toward said display device (50) and interrupts a flow of said first signal from said first signal outputting unit (20).

6. A display system for a theft-preventing apparatus for displaying an operational state of a first theft-preventing apparatus, said first theft-preventing apparatus being set to one of a resting state in which a caution with respect to a theft is not performed, a waiting state in which a start of a caution to a theft is waited for and a cautioning state in which a caution to a theft is performed, a second theft-preventing apparatus being set to one of the resting state and the cautioning state being further provided to said display system, said second theft-preventing apparatus having a second signal outputting unit (22) outputting the second signal when said cautioning state is set, characterized by:

a first signal outputting unit (20) outputting a first signal representing a state of said first theft-preventing apparatus;

a display device (50), connected to said first signal outputting unit (20), for providing a display in accordance with said first signal, said first outputting unit (20) also connectable to said second theft-preventing apparatus;

a determining unit (62) detecting a presence of said second signal from said second theft-preventing apparatus; and a display selecting unit (24) outputting said first signal in accordance with a state of said first theft-preventing apparatus when said determining unit (62) detects that said second signal is not output from said second theft-preventing apparatus, said display selecting unit (24) outputting said first signal in accordance with both a state of said first theft-preventing apparatus and a state of said second theft-preventing apparatus when said determining unit (62) detects that said second signal is present.

7. The display system for a theft-preventing apparatus as claimed in claim 6, characterized in that said second signal outputting unit (22) stops outputting said second signal when said resting state is set.

8. The display system for a theft-preventing apparatus as claimed in claim 6, characterized in that said first signal outputting unit (20) is provided to said first theft-preventing apparatus.

9. The display system for a theft-preventing apparatus as claimed in claim 6, characterized in that said display device (50) includes a light-emitting element (50) having a terminal connected to said first signal outputting unit (20) and having an opposite terminal being grounded.

10. The display system for a theft-preventing apparatus as claimed in claim 6, characterized in that said first signal outputting unit (20) includes a first rectifying element (30) which permits a flow of the first signal toward said display device (50) and interrupts a flow of said second signal from said second signal outputting unit (22), and said second signal outputting unit (22) includes a second rectifying element (44) which permits a flow of the second signal toward said display device (50) and interrupts a flow of said first signal from said first signal outputting unit (20).

11. The display system for a theft-preventing apparatus as claimed in claim 6, characterized in that said determining unit (62) includes:

a third rectifying element (66) which permits a flow of the second signal from said second signal outputting unit and interrupts a reverse flow of said second signal; and a transistor (64), connected to said third rectifying element (66), for outputting one of a high-level signal and a low-level signal in accordance with said second signal.

* * * * *